United States Patent
Tinoco et al.

(10) Patent No.: US 9,422,080 B2
(45) Date of Patent: Aug. 23, 2016

(54) PROCESS TO MANUFACTURE PEEL-RECLOSE PACKAGING FILM USING LASER SCORING AND PRESSURE SENSITIVE LABELS

(71) Applicants: Juan Carlos Tinoco, Woodbury, MN (US); Scott Hellquist, White Bear Lake, MN (US)

(72) Inventors: Juan Carlos Tinoco, Woodbury, MN (US); Scott Hellquist, White Bear Lake, MN (US)

(73) Assignee: LASERSHARP FLEXPAK SERVICES, LLC, Vadnais Heights, MN (US)

( * ) Notice: Subject to any disclaimer, the term of this patent is extended or adjusted under 35 U.S.C. 154(b) by 0 days.

(21) Appl. No.: 13/899,387

(22) Filed: May 21, 2013

(65) Prior Publication Data

US 2013/0320019 A1     Dec. 5, 2013

Related U.S. Application Data (60) Provisional application No. 61/650,012, filed on May 22, 2012.

(51) Int. Cl.
| | |
|---|---|
| B65D 17/00 | (2006.01) |
| B65D 75/58 | (2006.01) |
| B31D 1/00 | (2006.01) |
| B31B 19/00 | (2006.01) |
| B65B 61/02 | (2006.01) |
| B65B 61/18 | (2006.01) |
| B29C 59/00 | (2006.01) |
| B31D 1/02 | (2006.01) |

(52) U.S. Cl.
CPC ............. *B65D 17/12* (2013.01); *B29C 59/007* (2013.01); *B31B 19/00* (2013.01); *B31D 1/00* (2013.01); *B31D 1/0043* (2013.01); *B31D 1/026* (2013.01); *B65B 61/02* (2013.01); *B65B 61/184* (2013.01); *B65D 75/5838* (2013.01); *B29C 2791/009* (2013.01); *B31B 2219/25* (2013.01); *B31B 2219/9006* (2013.01)

(58) Field of Classification Search
CPC ........ B31D 1/026; B31D 1/00; B31D 1/0043; B65D 1/026; B65D 17/12; B65D 75/5838; Y10T 156/1056; Y10T 156/1057
USPC .................. 156/250, 252, 253, 256, 268–270
See application file for complete search history.

(56) References Cited

U.S. PATENT DOCUMENTS

| | | | | |
|---|---|---|---|---|
| 4,653,250 | A | * | 3/1987 | Nakamura ...................... 53/412 |
| 4,679,693 | A | * | 7/1987 | Forman ......................... 383/203 |
| 4,840,270 | A | * | 6/1989 | Caputo et al. ................. 206/205 |
| 5,158,499 | A | * | 10/1992 | Guckenberger ........... 206/524.2 |
| 6,113,271 | A | | 9/2000 | Scott et al. |
| 6,428,867 | B1 | | 8/2002 | Scott et al. |
| 6,589,622 | B1 | | 7/2003 | Scott |
| 7,717,620 | B2 | | 5/2010 | Hebert et al. |
| 2005/0178493 | A1 | * | 8/2005 | Broering et al. ............. 156/197 |
| 2008/0060751 | A1 | * | 3/2008 | Arrindell ...................... 156/248 |
| 2010/0021672 | A1 | * | 1/2010 | Prizzi et al. .................... 428/43 |
| 2011/0139363 | A1 | | 6/2011 | Hebert et al. |

* cited by examiner

*Primary Examiner* — Mark A Osele
*Assistant Examiner* — Christopher C Caillouet
(74) *Attorney, Agent, or Firm* — Law Office of Scott C Harris, Inc (57) ABSTRACT

Peel-Reclose packaging material formed using an adhesive label in combination with laser scoring technology. The adhesive label is applied over laser scored material before or after the laser score forms a pattern smaller than the adhesive label. The adhesive label and laser scored packaging material can then be opened and resealed. In one embodiment the adhesive label in combination with the packaging material has tamper resistant features.

18 Claims, 9 Drawing Sheets

PROCESS TO MANUFACTURE PEEL-RECLOSE PACKAGING FILM USING LASER SCORING AND PRESSURE SENSITIVE LABELS

This application claims priority from provisional application Ser. No. 61/650,012, filed May 22, 2012, the entire contents of which are herewith incorporated by reference.

BACKGROUND

In recent years several companies have supplied a variety of peel-reclose packages. Prior technology used mechanical die cutting of films in combination with pressure sensitive adhesive or PSA labels, or scoring of built-in PSA packaging films (PSA layers integrated into the packaging film structure). Mechanical die cutting is not a flexible or accurate process for controlled depth scoring. It requires the need for storing tooling and replacing tooling when worn or trying different patterns, materials, etc. Die cutting is not a clean process thus risking contamination of the product. Die cutting is not reliable due to inconsistency of the score depth, which could compromise the integrity of the package barrier or functionality of the opening feature. Puncture or sharp cuts can occur when die cutting that could result in package propagating in the wrong direction or opening involuntarily.

Integrated PSA into the structure of the packaging film is very expensive to manufacture and requires special machines to both laminate the PSA layer within the film structure and complex laser or mechanical cutting of the score pattern.

SUMMARY

The inventors conceived of a process to manufacture packaging material or film to produce Peel-Reclose packaging using laser scoring technology to form a laser scored pattern in the film in combination with an adhesive label.

One embodiment describes using laser scoring to create an easy open and tamper evident feature in combination with a Pressure Sensitive Adhesive (PSA) label to open and reclose the package.

The laser scored pattern can be of different shapes and sizes as described herein as different embodiments.

The laser score can be done before or after applying the PSA label to the packaging material or film, in different embodiments. The PSA label can be applied before or after the laser score is done.

Single or multiple PSA labels and scored patterns up can be done simultaneously within the web width of the packaging material or film.

The laser score can be done from either side of the packaging material or film, from the top or bottom layers.

The laser pattern can be set to cut thru certain targeted layers of the packaging film or material, or cut completely thru the entire structure of the packaging material or film, or both. The laser pattern can also be set to have different characteristics at different sections of the laser scored pattern or shape, having sections where the laser cuts partially thru the packaging film and other sections within the same pattern, where the laser cuts completely thru the packaging material or film.

BRIEF DESCRIPTION OF THE DRAWINGS

FIGS. 8 A-8 C show a tamper evident intricate layer;

FIG. 16 A-16 D show different alternatives of ways to apply the label before and after laser scoring.

DETAILED DESCRIPTION

The present invention generally relates to the field of reclosable packaging for a variety of products, such as perishable food, snack products, cleaning products, medical products, industrial goods, and other packaged items. A preferred embodiment describes a new way to manufacture packaging film for a reclosable package that includes a precision laser scored pattern or shape to create an easy open and tamper evidence feature in combination with an adhesive label. In embodiments, the adhesive label is a pressure sensitive adhesive (PSA) label for reclosable purposes, however other adhesive labels can be used. Embodiments facilitate the way that the consumer opens and recloses the package. Embodiments describe tamper evident packaging that allows users to inspect the package integrity prior to purchase.

The inventors recognized that use of lasers create the following advantages, described relative to the different embodiments.

- accurately control the depth of cutting in order to protect packaging material barriers.
- varying the depth of cut within the pattern (combine thru with partial-depth cutting or scoring in the pattern)
- integrate tamper-proof features in the pattern or separate feature formed by the combination of the laser, packaging material, and adhesive label.
- create a high-performance hinge design (complex pattern to improve hinge strength when pulled open)
- score from top-side of packaging material with label applied (when label material is transmissive to laser beam)

A laser is used to form a laser scored pattern or shape, which is normally slightly smaller in size than the reclosable PSA label. This typically leaves one edge without a score to form a hinged flap of label and film material with the outer perimeter of the flap having label adhesive exposed. The laser scored shape cuts the inner surface of the packaging film or targeted inside layers so as to form a weakened area. The end user can open the package by grasping the pull tab and peeling back the PSA label allowing easy open of the package along the laser scored pattern or shape. Once the package opens, the section of the film that was laser scored will remain attached to the PSA label. Since the laser scored pattern is smaller than the label, there is exposed adhesive between the perimeter of the PSA label and the scored shape. This exposed adhesive allows the consumer to stick the label back to the outside of the packaging film using that adhesive, thus reclosing the package and sealing the contents after opening.

Preferably, first a PSA label is applied to the outer surface or skin layer of the packaging film, then a pattern or shape is scored by a laser. The laser power is controlled such that the scoring is carried out to a certain depth on the inner surface of the packaging film. Depending on the material or structure of the packaging film, the preferred first step may require the laser to cut completely thru the entire film structure or target specific layers within it.

The PSA label includes a pull tab and is normally larger than the laser scored pattern or shape. Normally there is no adhesive applied to the pull tab, but there is adhesive applied to the rest of the label.

The laminated PSA label on the scored packaging film becomes a complete Peel-Reclose packaging material that can then be applied to various packages.

Figure 1:
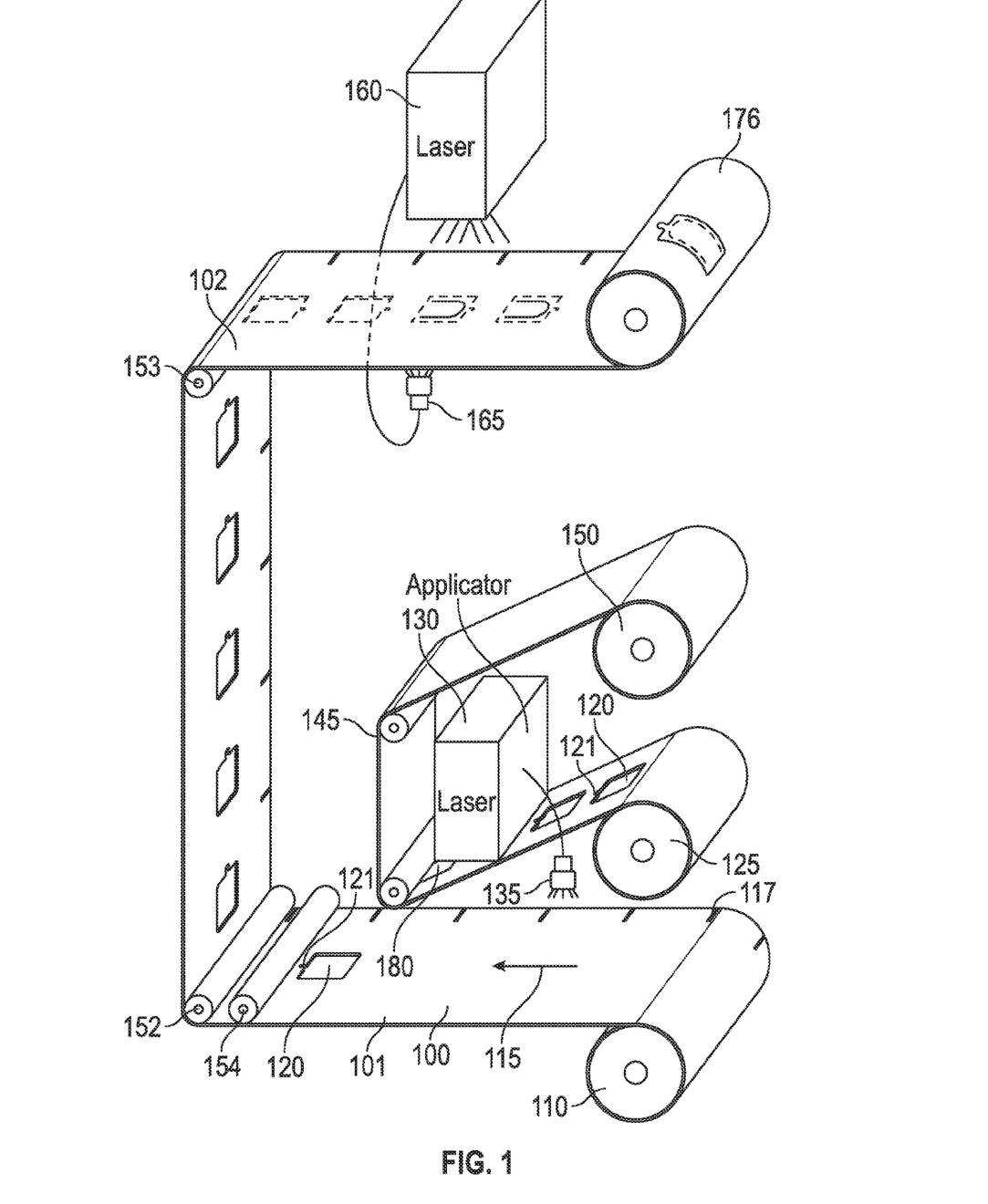
FIG. 1 is a block diagram of an in-line label applicator and laser system.

An embodiment for forming the assemblies to be put on the packages is shown in FIG. 1. The first step is to apply a pressure sensitive adhesive (PSA) label to the outer surface of a packaging film. The packaging film 100 is shown initially wound around on a shaft 110, and unwinds in the machine direction 115. The packaging film 100 may include printed graphics such as 117, and the pressure sensitive label 120 may be applied at locations relative to these printed graphics 117. The PSA label 120 can be applied anywhere on the packaging film web 100, not limited by machine direction or cross web direction position location.

In the embodiment of FIG. 1, the pressure sensitive adhesive ("PSA") label is applied while the web of packaging film is moving. The PSA label 120 is packaged in a roll format shown as 125 with silicon coated carrier liner protecting the adhesive. The PSA label is also oriented to align with the packaging film in the web travel direction. Inline label application is done using a label applicator 130, which controls the rate of the unwinding of the label stock 120 from the label stock roll 125 a print registration sensor 135, label dispensing mechanism 140, pressure roller 145, application roller 154 and liner rewind 150. The roll of PSA label runs through the label applicator, causing the PSA label to be released and applied to the outer surface of the packaging film 100 at the desired area relative to the marks or print 117 within the packaging film 110. After the label 120 is applied, the label carrier liner is rewound and to the rewind wheel 150.

Once the PSA label 120 is applied, the moving web of packaging film is then turned on a pair of idlers 152, 153. After rotating, the outer surface 100 of the packaging film faces down, and the inner surface 102 of the packaging film faces up. A laser system 160 is located near the moving web, facing towards the inner surface 102 of the packaging film. A photo sensor 165 detects the printed registration marks or print on the packaging film or detects the pre applied label, and allows to triggers the laser system 160 to score a desired pattern or shape into the packaging film 100 in registration with the PSA label 120. A key advantage of using laser technology is having the ability to control the energy being delivered into the material to ensure consistent score depths to create an easy open feature without compromising film barriers, in this case the laser score can be designed to prevent cutting into barriers or the PSA label. This can for example, set the power of the laser appropriately. It should be understood, however, that, the PSA label can be applied after the packaging film is being laser scored, also that the packaging film can be laser scored from either side of the packaging film, whether the PSA label is pre applied or not. Also, both sides of the packaging film could be laser scored simultaneously.

In an embodiment, the outer dimensions of the laser pattern or shape are slightly smaller than the PSA label outer dimensions. There are no limitations on the shape or size of neither the PSA label nor the laser scored feature. However, it is preferred to maintain the size of the scored feature smaller than the PSA label. The objective is to create a hinged flap within the PSA label that is not pulling the film with it when lifted and will have adhesive exposed that will be used to reclose the package.

FIG. 17 Illustrates the PSA label 1700 and packaging film 1705 once the package is opened 1715, where the laser scored film 1710 is adhered to the PSA label 1700. Outline perimeter 1720 between PSA label and film shows adhesive exposed that will be used to reclose the package. The packaging film edge or flap 1725 is where the PSA label 1720 adhesive exposed will be applied back to when packaged is resealed.

After assembling, e.g., using the device of FIG. 1, the peel-reclose packaging solution (packaging film, PSA label applied, and laser score pattern) is finished. This is then rewound onto a second finished shaft, where the outer surface of the packaging film faces out. The finished roll is shipped to the customer's packaging line where usually the customer will form a pouch or bag and fill it with product, or the product is placed in a preformed tray or container and the peel-reclose packaging solution is applied to seal the top of the tray or container.

Figure 4:
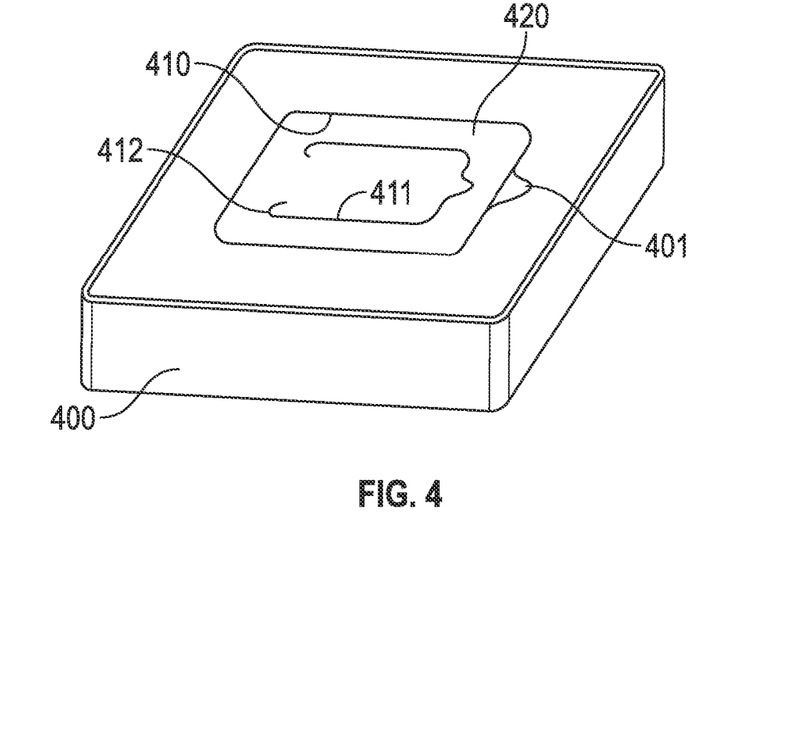
FIG. 4 shows a PSA label on a plastic tray or package.

FIG. 4 illustrates the peel-reclose packaging solution being heat sealed to the top of a preformed tray or container package 400. The PSA label which can be any of the labels shown in any of the figures of this application shown simply generically as 410, having the pull tab 401 and a laser scored feature 411. The pull tab 401 may have no adhesive applied to allow the consumer to easily lift and grasp the tab. The consumer opens the peel-reclose package by pulling up on tab portion 401 of the label to lift the label. The laser scored pattern on the inner surface 411 causes the opening to occur on the laser scored pattern. The curved shape or hooks 412, 413 at the back end of the laser scored pattern, allows the propagation to stop and prevent the consumer for opening the package beyond the laser scored opening area. The laser scored packaging film is adhered to the label using the adhesive. The laser scored pattern is slightly smaller than the label, which creates a perimeter between the PSA label and the scored shape, thus allowing the consumer to reclose the package by resealing the exposed adhesive to the packaging film.

The pull tab of the PSA label has a bottom surface under which no, same, or different adhesive is used which is optimized for peel and reclose.

Tamper evident features can be included within the laser scored pattern in some embodiments described herein. In some embodiments, tamper evidence is a part of the scored pattern where once the package is open, the film or label will break apart from the score pattern and will not be able to line up within the score pattern when reclosed. The tamper evident feature is to ensure product safety for the consumer in the market place. Examples of tamper evident features can be observed in the embodiments of FIGS. 7, 8, and 9. The laser scored pattern can be done in registration with the PSA label or the PSA label can be applied in registration with the scored pattern.

Figure 2:
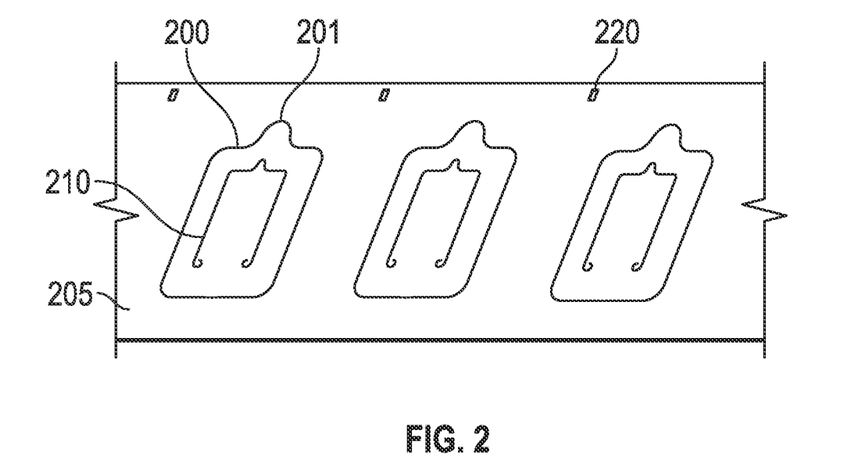
FIG. 2 shows a label with pressure sensitive labels oriented in a transverse direction across the web of material.

The PSA label can be oriented in multiple different directions on the packaging film. FIG. 1 shows the label oriented such that the tab 121 of the PSA label is oriented in the direction of movement across the machine. FIG. 2 shows an alternative embodiment, where there is a PSA label 200 having a tab 201. In this embodiment, the tab 201 faces towards the edge of the packaging film 205 and the PSA label is oriented across the web within the packaging film. The laser score 210 is shown being formed on the inner layer of the packaging film. While the label itself is applied on the outer surface of the packaging film.

Figure 3:
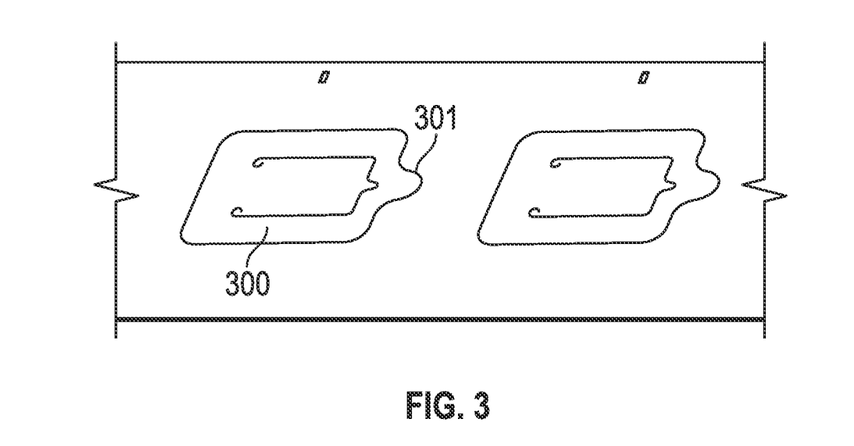
FIG. 3 shows a PSA label oriented in the machine direction.

FIG. 3 shows an alternative embodiment, where the tab 301 of the label 300 faces in the direction of the machine, as shown in FIG. 1. It should be understood, however, that the label and the scored pattern can be formed in any desired direction, and at any location relative to the print or eye mark or randomly placed within the packaging film. In FIG. 3, the PSA label 300 is centered with the eye mark. In FIG. 2, the PSA label 200 is placed between eye marks. Alternative configurations can also be used.

Figure 5:
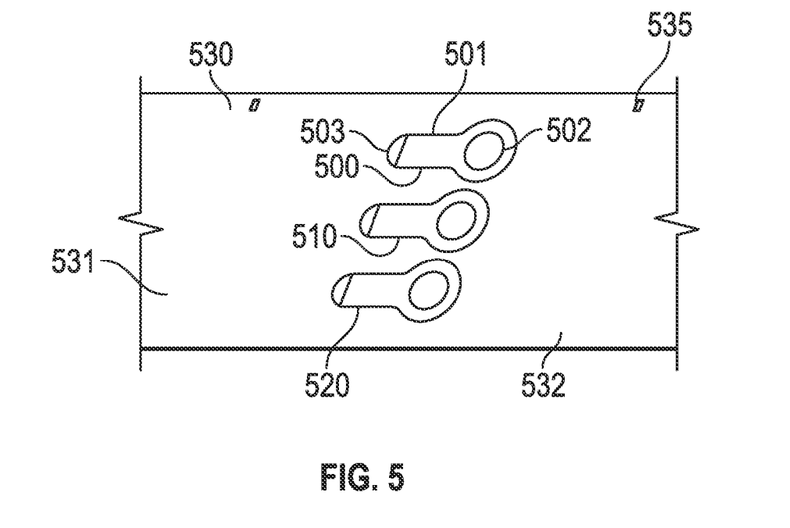
FIG. 5 shows a 3 across PSA label.

FIG. 5 shows a 3 across configuration, where 3 PSA labels 500, 510 and 520 are located 3 across on the surface of the packaging film 530. In registration with the printed eye marks. As in the other embodiments, the PSA label is on the outer surface 531 of the packaging film 530, and the laser scores 502 are located on each inner surface 532 matching the location inside the body of the label.

In this embodiment, each label such as 500 has a round portion 501, and in the center of the round portion is formed the laser score 502. The pull tab 503 is attached to the edge of the round portion.

Figure 6:
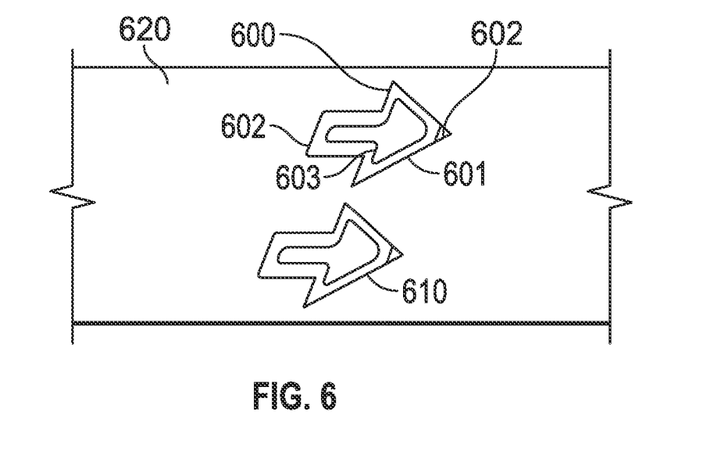
FIG. 6 shows a 2 across PSA label.

FIG. 6 shows an alternative embodiment, with the two across configuration, where the label is in the shape of a triangle with a pull tab. This shows two labels 600, 610 on the packaging film 620. Each label such as 600 includes a triangular portion 601 with a pull tab portion 602. This forms generally an arrow shaped label. The laser score scores out the inner surface in a shape 603, that covers a portion of the triangle.

Figure 7:
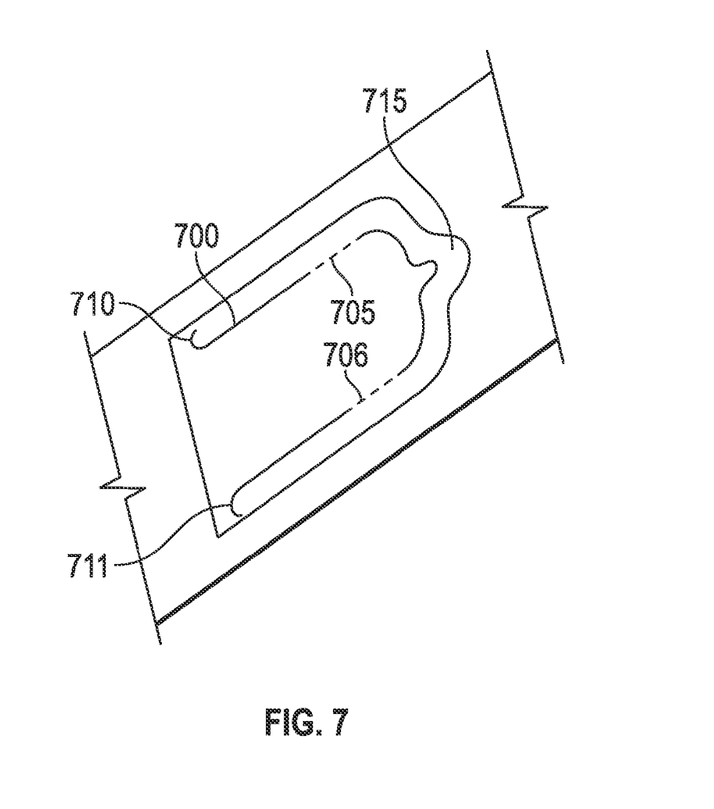
FIG. 7 shows a laser score within intermittent cut that provides tamper evident.

FIG. 7 shows an alternative embodiment in which the laser score forms an partial score opening. The PSA label 701 with the laser score 700, which can be used with any of the embodiments disclosed herein, has first and second portions 705, 706 in which the laser score is not complete or intermittent, where there is a portion of laser score next to a portion of non-laser score. In this way, the system is tamper evident, since the material is not completely scored, and will make a sound and feeling when it is opened for the first time. The curved shape or hooks 710, 711 at the back end of the laser scored pattern, allows the propagation to stop and prevent the consumer for opening the package beyond the laser scored opening area. Pull tab is shown as 715.

Another tamper evident embodiment shown in FIG. 8. FIG. 8 creates an intricate pattern which cannot fit back together after separation. Note the patterns such as FIG. 2 have a laser scored pattern 210 which is formed of simple geometric shapes such as curves. In the FIG. 8 embodiment, the pattern 800 includes straight and curved portions, and includes a pull tab 821, and a shape 805 that will facilitate the propagation of the scored pattern or initiation of the opening. The curved shape or hooks 815, 816 at the back end of the laser scored pattern, allows the propagation to stop and prevent the consumer for opening the package beyond the laser scored opening area. In addition, the PSA label 820 is pulled back for easy open there is an intricate tamper evident pattern 810, 811 which is sufficiently small and long such that the pattern part, once removed, will not fit back automatically. Tamper evident allows for product safety.

Figure 8A:
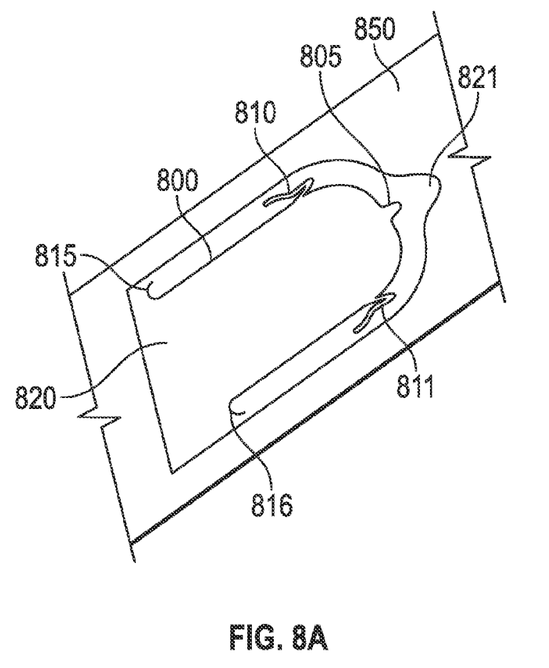
Figure 8B:
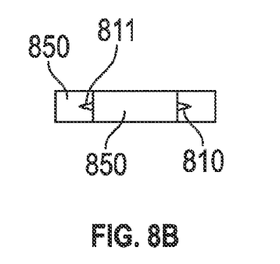
Figure 8C:
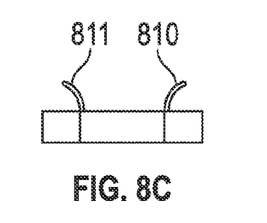

FIG. 8A shows the top version showing the laser score. FIG. 8B shows a side version, showing how the laser score is seated after the score is made. The packaging film 850 is scored. However, once the scored area 852 is removed, the intricate portions 810, 811 will no longer fit back into the package. Accordingly, after the package has been opened, the portions 810, 811 will extend outside the plane of the package as shown in FIG. 8C.

Figure 9:
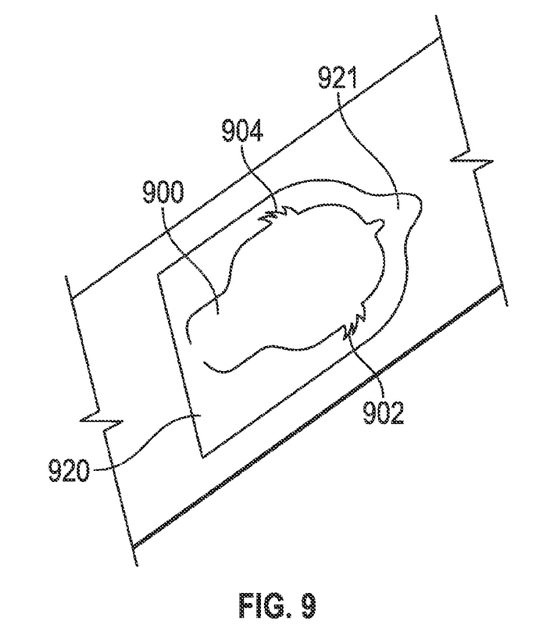
FIG. 9 shows a tamper evident alternative pattern.

FIG. 9 shows another tamper evident package, which includes the PSA label 920 with a pull tab 921 and a laser score 900 that includes zigzag patterns 902, 904 which again cannot fit back into the packaging, once removed, thus being tamper evident once the package is opened.

Figure 10:
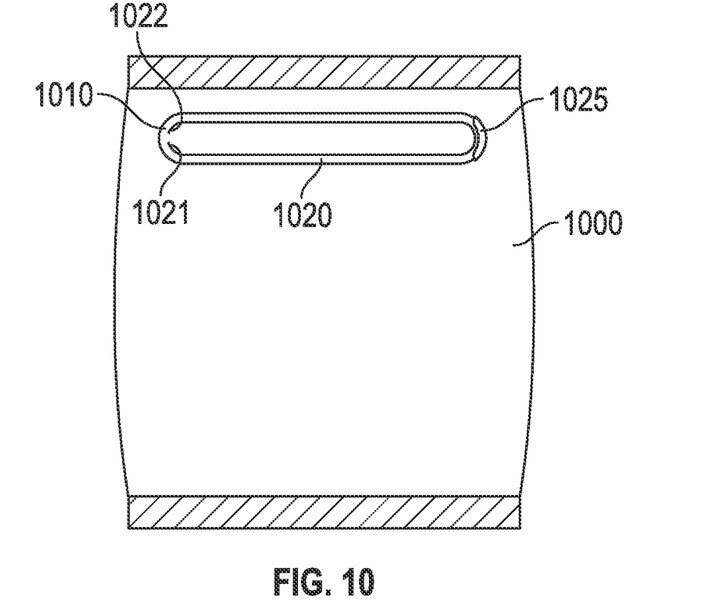
FIG. 10 shows a pillow pouch with the PSA label.

Other embodiments show other packages on which the Peel-Reclose packaging solution can be used. FIG. 10 shows the PSA label being used on a pillow pouch 1000. In this embodiment, the PSA label 1010 is oval in shape, and the laser scored feature 1020 is also oval in shape and contains hooks 1021, 1022 at the back end that will stop the propagation. A pull tab 1025 is formed on the label 1010, at one edge of the label in an area where there is no adhesive on the label.

Figure 11:
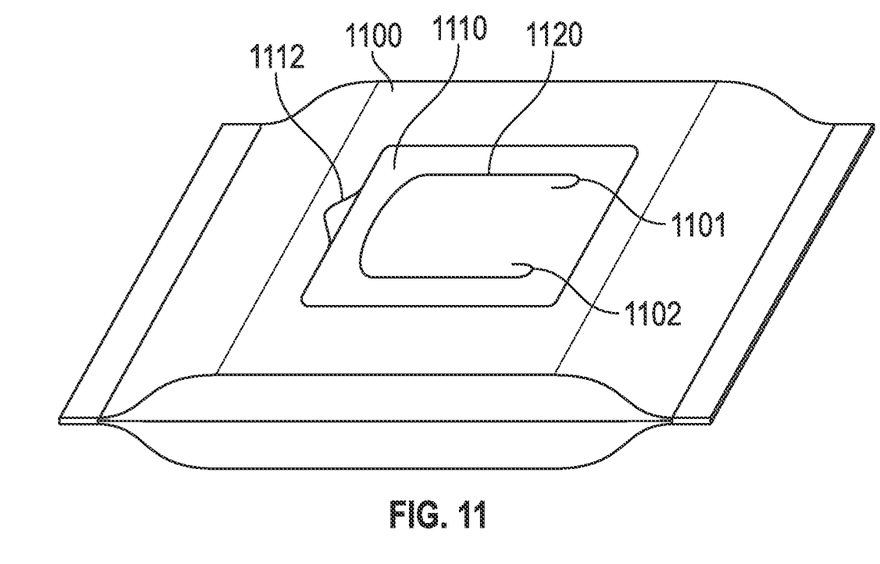
FIG. 11 shows an alternative embodiment of the pillow pouch with the PSA label.

FIG. 11 shows an alternative embodiment, in which a pillow pouch 1100 is formed with a PSA label of the type shown in FIG. 1. The label is shown as 1110, as rectangular with rounded edges, and a pull tab 1112 at one edge, where the pull tab has an area that extends from the label, but has no adhesive on it. The laser score 1120 is a rounded score area, with hooks 1101, 1102 at the back end that will stop the propagation, forming an outline of a size smaller than the outer area of the PSA labels.

Figure 12:
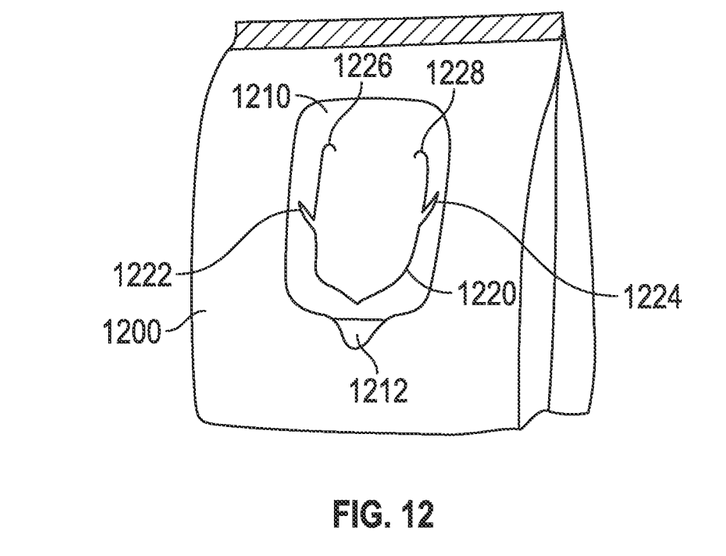
FIGS. 12 and 13 show a standup pouch with a PSA label.

FIG. 12 shows another embodiment, where a standup pouch 1200 is used with a PSA label 1210 applied to the front or back of the pouch. The PSA label 1210 is rectangular with rounded edges, and a pull tab 1212. The laser score opening 1220 is formed with anti-counterfeit features 1222 and 1224 at opposite edges, forming a unique shape which may be difficult to duplicate or unable to align back once package is opened. There are also hooks 1226, 1228 at the back end that will stop the propagation.

Figure 13:
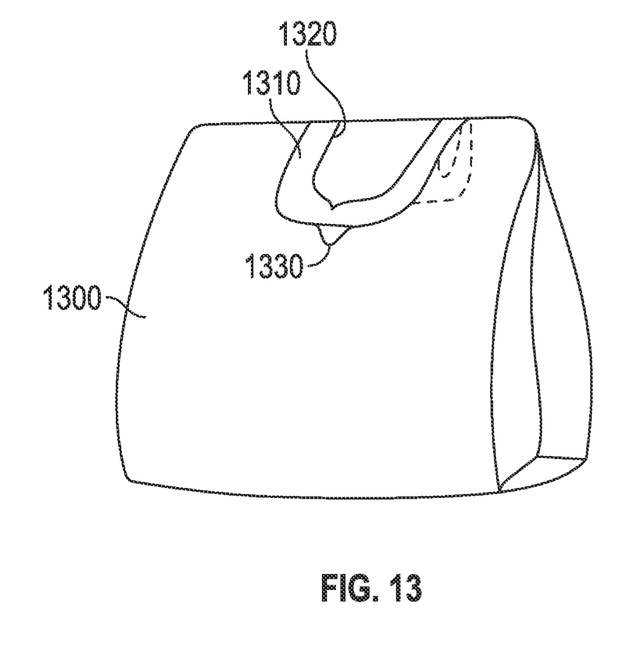

FIG. 13 shows an alternative embodiment, in which the standup package 1300 includes the PSA label 1310, with pull tab 1330 applied to the top surface with an laser scored opening 1320 in inner surface of the packaging film.

Figure 14:
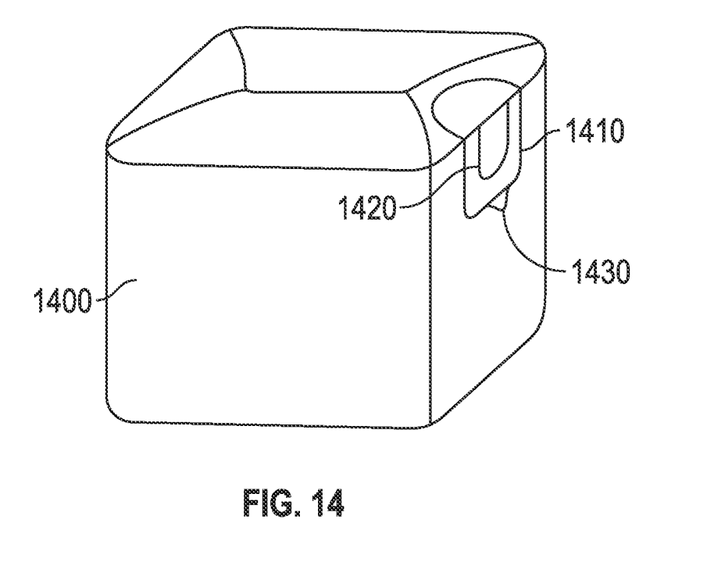
FIG. 14 shows a vertical pouch with a PSA label.
Figure 15:
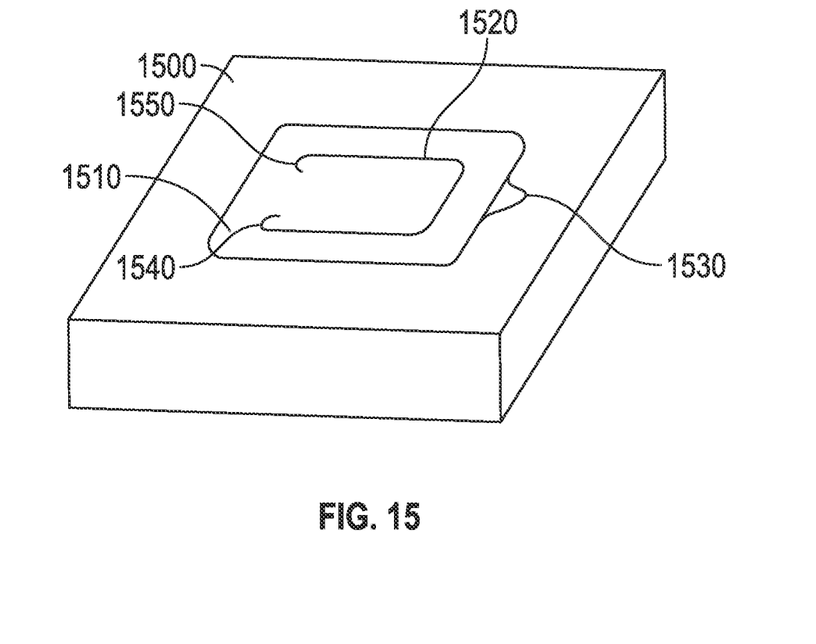
FIG. 15 shows a box or folding carton with the PSA label.

FIG. 14 shows an alternative embodiment, where there is a vertical pouch 1400, that has the label assembly 1410 applied to one edge thereof, with pull tab 1430, with the laser score 1420 on that edge. This unique feature will allow the consumer to pour the contents of the package FIG. 15 shows an alternative embodiment, in which the label 1510 is applied to a box or folding carton 1500, with the laser scoring the folding carton to create pattern 1520 therein. The pull tab 1530 allows for easy start to opening the package and 1550 and 1540 show laser scored hooks at the back end that will stop the propagation.

FIGS. 16A thru 16D show cross-sections of operations where the label is applied before laser scoring. It is understood, however, that the PSA label can be applied after the laser score is being done. According to FIG. 16A, a PSA label 1600 is applied to the packaging film or material 1610. In the embodiments 16A, 16B, the laser 1620, which can be the same laser shown as 160 in FIG. 1, is applied from outside the PSA label into the packaging film. A PSA label 1600 is formed of a material which is transmissive to the laser beam. An example of low absorption or transmissive material is polyethylene (PE). There are other substrates or packaging films such as, polypropylene (PP) and nylon (PA) that could be transmissive to the laser beam, if used in combination with the proper wavelength laser type. Thus the laser beam travels through the PSA layer, and cuts the first layer of the packaging film generally shown as 1635, for example could be a polyester (PET) layer. In this embodiment, a barrier layer 1640, for example polyethylene (PE) is provided which also may be either immune to laser, or may be harder to cut so that only the first layer is actually penetrated. Typical laminations include polyester (PET), polypropylene (PP), and PLA, within the first layer of the structure.

Figure 16A:
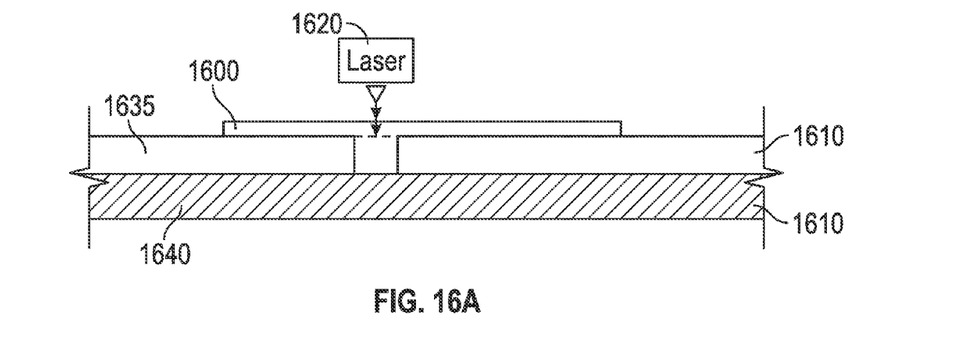
Figure 16B:
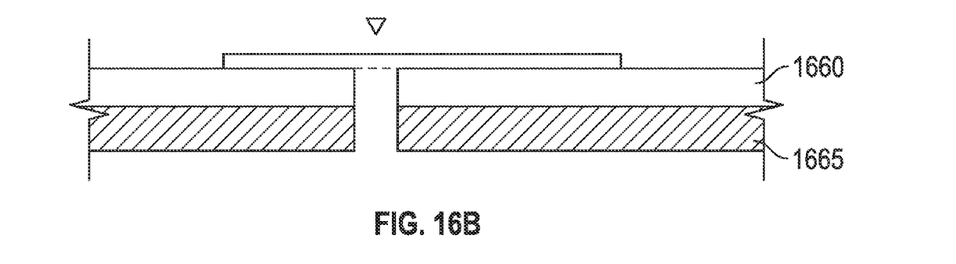
Figure 16C:
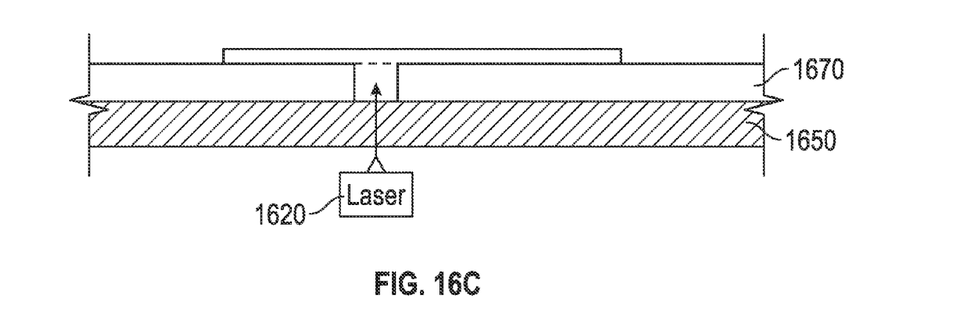
Figure 16D:
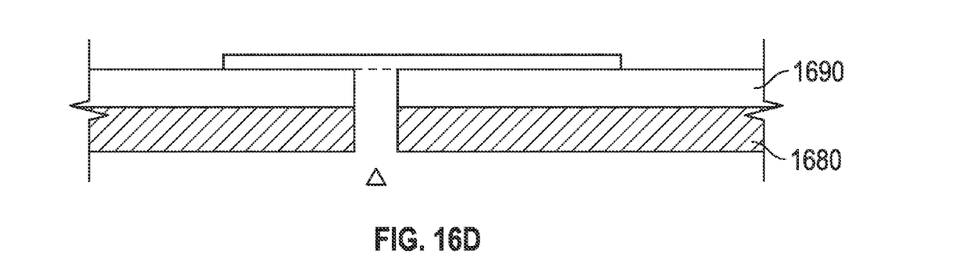

FIG. 16B shows an alternative embodiment, where It might be necessary to cut deeper into the film structure to create an easy open feature, so that the power of the laser beam is increased to cut the entire structure of the packaging film both the first 1660 and the barrier or sealant layers 1665. It might be necessary to have barrier properties within the PSA label to preserve the product.

FIG. 16 C, 16D show another embodiment of applying the laser score after the PSA label has already been applied to the top of the packaging film. In this embodiment, the laser score is applied from the sealant side of the packaging film, using laser 1620. FIG. 16C. In this embodiment, the barrier layer 1650 is transmissive to the laser beam, thus cutting the first layer 1670 of the packaging film this way, without cutting the PSA label. FIG. 16 D shows alternative embodiment in which the laser score is applied from the sealant side through both the barrier layer 1680 and the first layer 1690 of the packaging film, while stopping the laser beam at the bottom of the PSA label. Same as FIG. 16B, It might be necessary to have barrier properties within the PSA label to preserve the product.

Our invention is flexible and allows for quick change of scoring patterns and shapes, tamper evidence and security features can be added or modified at any time, and lower cost of manufacture. The laser system and label applicator are readily available equipment and can be integrated into existing packaging film processes without added time or costs. The laser never wears out and is a non-contact process which guarantees a clean process. Laser scoring produces a very consistent score depth, which results in a reliable package that will always open and the reliability of keeping the products protected within the package. PSA labels are mass produced, low cost, and can be customized according to the unique application. Label material substrate, size, shape, and adhesive type can easily be selected to any type of packaging film, material, or particular application. Specific adhesives, including pressure sensitive, can be selected to complaint with FDA regulations regarding food grade & medical products as to not contaminate the product itself in the case the adhesive migrates or get in touch with the product.

Those of skill in the art would further appreciate that the various illustrative logical blocks, modules, circuits, and algorithm steps described in connection with the embodiments disclosed herein may be implemented as electronic hardware, computer software, or combinations of both. Note that many of the embodiments require controlling, and the controllers may be electronic or computer systems as explained herein.

There are no limitations regarding the packaging film or material used, it can be single polymer, multi-polymer, paper, folding carton, multi-laminate structures, etc.

As described on previous embodiments, our preferred method is to use Pressure sensitive adhesives, that are food safe, However, this invention is not limited to any specific label material, adhesives type, or carrier liner or linerless label. The PSA label material can be designed to be laser transmissive, meaning the laser beam will not cut thru it, and has barrier properties built in. Examples are shown in FIG. 16.

The PSA label may be applied to the packaging film, randomly at any location, within a fixed repeat, or orientation or in registration within the print or package type.

The PSA label and laser score process can be completed in continuous or indexing mode.

The PSA label(s) can be oriented in either ways machine direction or transverse direction related to the film The PSA labels can be pre-applied off line or in line with the laser system and then laser scored, or at the contrary the packaging film or material can be laser scored first, then apply the PSA label. Examples of Different approaches are shown in FIG. 16.

The laser score can be done either from the inner or outer layer of the film, whether the PSA label is applied before or after the laser score is done. Examples of Different approaches when pre-applied PSA labels are shown in FIG. 16

The Laser score depth can be adjusted accordingly, and depending of the structure of the packaging film or material, it may be required to laser cut completely thru the entire film or material structure. Also, the laser pattern could be done so that sections have the laser scored pattern or shape, where the laser cuts partially thru the packaging film and other sections within the same pattern, where the laser cuts completely thru the packaging material or film.

The PSA label could be cut either mechanically or using laser technology, normally it is laminated to a carrier liner and provided in roll stock. The PSA label could be linerless also. The PSA label could be clear or printed, made of a variety of substrates such as PP, BOPP, PET, PE, etc. The size, thickness or shape of the PSA label is not limited; it is normally customized to fit a particular package type and application. The PSA label stock can be discrete or continuous. PSA label contains a pull tab or addendum with no adhesive under that is used to peel or lift the PSA label by the consumer. The adhesive used is pressure sensitive, or not, and could be designed with different bond strengths and or types of adhesives types, such as solvent free, water base, etc. Depending upon the application the adhesive could be also designed to be food safe and approved by FDA to be in contact with food or product.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, display port, or any other form. This may include laptop or desktop computers, and may also include portable computers, including cell phones, tablets such as the IPAD™, and all other kinds of computers and computing platforms.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims.

The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of forming a peel-reclose system using an adhesive label in combination with laser scoring technology, comprising:

unwinding a packaging material from a roll in a processing machine;

applying a pressure sensitive adhesive label on an unwound packaging material along a path defined by the processing machine, said adhesive label having an outer shape and having reclosable adhesive, and having a pull tab at one portion;

wherein the packaging material includes a first laser cuttable layer below the pressure sensitive adhesive label, and a barrier layer, below said said first laser-cuttable layer, said barrier layer that protects against cutting by a laser;

sensing printed registration marks on said packaging material;

responsive to said sensing of registration marks, triggering a laser of a first type along the path defined by the processing machine, wherein the adhesive label is formed of a label material that is laser transmissive to the laser of the first type;

wherein the laser is triggered to cut, by producing a ray that is transmitted through the adhesive label material that is laser transmissive to the laser and not cutting the adhesive label material when the ray is transmitted through the adhesive label material, while the laser cutting the first laser cuttable layer that is below the adhesive label material, to a controlled depth in locations where the adhesive label has already been located, said laser delivering a controlled amount of energy to cut the packaging material by a controlled amount at a location relative to said registration marks, without cutting the adhesive label, and to cut in a specified shape at said locations on the packaging material that are aligned with the adhesive label, where said shape has smaller outer dimensions than an outer shape of the adhesive label, where after said cutting, said pull tab allows pulling the adhesive label to separate the packaging material that has been laser scored from remaining packaging material, and where the adhesive on the adhesive label allows re-adhering the adhesive label and separated packaging material back to the remaining packaging material;

wherein the packaging material with the adhesive label and the laser score opening forms a finished reclosable package part; and rewinding the packaging material with the label applied thereto and the cut formed therein to form a finished roll.

2. The method as in claim 1, further comprising applying the finished reclosable package part to an area of a package having an opening therein.

3. The method as in claim 2, wherein said package is one of a plastic tray, container, or box of any size, or a pouch or bag of any size or type.

4. The method of claim 1, wherein the laser cuts through the packaging material from a top of the packaging material.

5. The method as in claim 1, wherein the reclosable package opening is substantially rectangular with rounded edges or circular in shape, and where the laser scored area or opening is an area that is smaller than the adhesive label.

6. The method of claim 1, wherein said laser leaves a portion of the packaging material unscored to form a hinged flap that accurately reseals onto the packaging film and which has a feature that stops the separated packaging material attached to the label from tearing off from the remaining packaging material.

7. The method as in claim 1, wherein the specified shape is formed by the laser with tamper evident portions that have a first layout of pieces of the shape prior to the initial opening of the package by an end-user, and where said first layout is not capable of being returned into its initial configuration when closed after the initial opening.

8. The method as in claim 7, wherein said tamper evident portions include all portions which are in a single plane of the label prior to first opening of the package, and where said tamper evident portions are formed to have a shape and structure that forces portions to extend outside the plane of the label when reclosed after once opening.

9. The method as in claim 7, wherein the tamper evident portions do not fit into its initial package configuration when closed after once being opened and is forced to extend above the plane of the label after once being opened.

10. The method as in claim 1, wherein the adhesive label is applied randomly at any location on the packaging film.

11. The method as in claim 1, wherein an adhesive label application and a laser score process is carried out in one of continuous or indexing mode.

12. The method as in claim 1, wherein the adhesive label can be oriented in either of a machine direction or a transverse direction related to the packaging material.

13. A method as in claim, 1 wherein the packaging material used includes one of single polymer, multi-polymer, paper, folding carton, or multi-laminate structures.

14. The method as in claim 1 wherein the applying the pressure sensitive label material comprises also unwinding the pressure sensitive label material from a roll, separating the pressure sensitive label material from a carrier liner that protects adhesive on the roll, applying said separated pressure sensitive label material onto the packaging material, and rewinding the carrier liner.

15. A method of forming a peel-reclose system using an adhesive label in combination with laser scoring technology, comprising:

providing a pressure sensitive adhesive label on a packaging material, said adhesive label having an outer shape and having reclosable adhesive, and having a pull tab at one portion which allows pulling the adhesive label;

using a laser for cutting to a controlled depth into the packaging material within an area of the adhesive label in an intricate shape, where said intricate shape has a first layout of pieces of the shape prior to the initial opening of the package by an end-user, and where said first layout is not capable of being returned into its initial configuration when closed after the initial opening, said cutting being at locations on the packaging material that are aligned with the adhesive label, having using an adhesive on said adhesive label to re-adhere the adhesive label back to the packaging material after the package has been opened, into a different layout of pieces than a configuration prior to the package being opened, where said label is initially in a single plane, and is formed to have a shape and structure that forces portions to extend above and outside of said single plane of the package when re closed after being once opened;

and said shape has a smaller outer dimensions than an outer shape of the adhesive label, wherein the packaging material with the adhesive label and the laser score opening forms a finished reclosable package part, wherein the adhesive label is formed of a material that is laser transmissive, so that the laser will not cut through the adhesive label material, wherein the packaging material includes a first laser cuttable layer, and a barrier layer, below said first laser-cuttable layer, said barrier layer that protects against cutting by a laser;

wherein the laser cuts through the adhesive layer material that is laser transmissive to a specific laser that is used for the cutting, and not cutting the adhesive layer material, while cutting the first laser cuttable layer to a depth through the packaging material in locations where the adhesive label has already been located, and not cutting through said barrier layer.

16. The method as in claim 15, wherein said using the laser comprises sensing printed registration marks on said packaging material; and responsive to said sensing of registration marks, triggering the laser to operate while controlling a power of the laser such that scoring is carried out only to a certain depth through the packaging material but not to cut the adhesive label.

17. The method as in claim 15 wherein the method is carried out on a processing machine, and further comprising unwinding the packaging material from a roll in the processing machine; applying the pressure sensitive adhesive label on the unwound packaging material along a path defined by the packaging machine, said adhesive label having an outer shape and having reclosable adhesive, and having a pull tab at one portion; and rewinding the packaging material with the label applied thereto and the whole form therein to form a finished roll.

18. The method as in claim 15, wherein said intricate shape is a zigzag pattern which once removed from its initial configuration cannot fit back into the packaging in that initial configuration.

* * * * *